US012719712B2

(12) United States Patent
Lu et al.

(10) Patent No.: US 12,719,712 B2
(45) Date of Patent: Aug. 25, 2026

(54) INTERACTIVE PRESENTATION VISUAL GUIDE

(71) Applicant: INTERNATIONAL BUSINESS MACHINES CORPORATION, Armonk, NY (US)

(72) Inventors: Fang Lu, Billerica, MA (US); Jeremy R. Fox, Georgetown, TX (US); Jana H. Jenkins, Raleigh, NC (US); John Russell Gerberich, Palatine, IL (US)

(73) Assignee: International Business Machines Corporation, Armonk, NY (US)

(*) Notice: Subject to any disclaimer, the term of this patent is extended or adjusted under 35 U.S.C. 154(b) by 0 days.

(21) Appl. No.: 18/309,296

(22) Filed: Apr. 28, 2023

(65) Prior Publication Data

US 2024/0364552 A1 Oct. 31, 2024

(51) Int. Cl.
*H04L 12/18* (2006.01)
*G10L 15/26* (2006.01)

(52) U.S. Cl.
CPC .......... *H04L 12/1831* (2013.01); *G10L 15/26* (2013.01); *H04L 12/1818* (2013.01)

(58) Field of Classification Search
None
See application file for complete search history.

(56) References Cited

U.S. PATENT DOCUMENTS 8,689,097 B2 4/2014 Varadarajan et al.
9,648,061 B2 5/2017 Cunico et al.
11,195,544 B2 12/2021 Basson et al.
2011/0263946 A1 10/2011 el Kaliouby et al.
2014/0108085 A1 4/2014 Henriksen et al.
2015/0294220 A1* 10/2015 Oreif ........................ G06N 5/04 715/835
2019/0295565 A1 9/2019 Basson et al.
2019/0364154 A1* 11/2019 Hermanek ........... G06Q 10/107
2020/0243095 A1 7/2020 Adlersberg et al.
2023/0274730 A1* 8/2023 Fantinuoli ............... G06T 11/60

OTHER PUBLICATIONS

Unknown, “Visual Content Trigger Notifications”, IP.com, IP.com No. IPCOM000245381D, published Mar. 4, 2016, 6 pages.
Unknown, “AI Guided Presentation Optimizer”, IP.com, IP.com No. IPCOM000263130D, published Jul. 31, 2020, 3 pages.
(Continued)

*Primary Examiner* — Angela Nguyen
(74) *Attorney, Agent, or Firm* — Gavin Giraud

(57) ABSTRACT

A method, system, and computer program product that is configured to: receive a meeting agenda, a meeting time, a speaker, and an audience of a meeting; analyze the meeting agenda and the meeting time for an outcome of the meeting; categorize the meeting agenda and the meeting time into a tier level architecture using natural language processing (NLP); create a knowledge corpus using the categorized tier level architecture and the outcome of the meeting; dynamically adjust the categorized tier level architecture based on a conversation between the speaker and the audience during the meeting; train a tier level model using the created knowledge corpus; and dynamically adjust the categorized tier level architecture based on the trained tier level model.

20 Claims, 4 Drawing Sheets

(56) References Cited

OTHER PUBLICATIONS

Thushari Atapattu et al., “An Identification of Learners' Confusion through Language and Discourse Analysis”, arXiv, Cornell University, https://arxiv.org/abs/1903.03286, Mar. 8, 2019, 11 pages.
Tyler Doll, “LDA Topic Modeling: An Explanation”, https://towardsdatascience.com/Ida-topic-modeling-an-explanation-e184c90aadcd, Published Jun. 24, 2018, 14 pages.
Ria Kulshrestha, “A Beginner’s Guide to Latent Dirichlet Allocation(LDA)”, https://towardsdatascience.com/latent-dirichlet-allocation-Ida-9d1cd064ffa2, Published Jul. 19, 2019, 20 pages.
Kim Gajda, “Run daily stand-up meetings”, https://www.ibm.com/garage/method/practices/culture/practice_daily_standup/, downloaded Apr. 28, 2023, 6 pages.

* cited by examiner

INTERACTIVE PRESENTATION VISUAL GUIDE

BACKGROUND

Aspects of the present invention relate generally to an interactive presentation visual guide and, more particularly, to an interactive presentation visual guide which dynamically analyzes content that has been covered during a meeting and identifies key items that have not been covered during the meeting.

In hybrid work environments, video conferencing is being used more often to communicate and hold work meetings. In order to accommodate remote and hybrid work environments, video conferencing provides multipoint reception and transmission of audio and video signals by people in different locations for real time communication.

SUMMARY

In a first aspect of the invention, there is a computer-implemented method including: receiving, by a processor set, a meeting agenda, a meeting time, a speaker, and an audience of a meeting; analyzing, by the processor set, the meeting agenda and the meeting time for an outcome of the meeting; categorizing, by the processor set, the meeting agenda and the meeting time into a tier level architecture using natural language processing (NLP); creating, by the processor set, a knowledge corpus using the categorized tier level architecture and the outcome of the meeting; dynamically adjusting, by the processor set, the categorized tier level architecture based on a conversation between the speaker and the audience during the meeting; training, by the processor set, a tier level model using the created knowledge corpus; and dynamically adjusting, by the processor set, the categorized tier level architecture based on the trained tier level model.

In another aspect of the invention, there is a computer program product including one or more computer readable storage media having program instructions collectively stored on the one or more computer readable storage media. The program instructions are executable to: receive a meeting agenda, a meeting time, a speaker, and an audience of a meeting; analyze the meeting agenda and the meeting time for an outcome of the meeting; categorize the meeting agenda and the meeting time into a tier level architecture using natural language processing (NLP); create a knowledge corpus using the categorized tier level architecture and the outcome of the meeting; dynamically adjust the categorized tier level architecture based on a conversation between the speaker and the audience during the meeting; train a tier level model using the created knowledge corpus; and dynamically adjust the categorized tier level architecture based on the trained tier level model.

In another aspect of the invention, there is a system including a processor set, one or more computer readable storage media, and program instructions collectively stored on the one or more computer readable storage media. The program instructions are executable to: receive a meeting agenda, a meeting time, a speaker, and an audience of a meeting; analyze the meeting agenda and the meeting time for an outcome of the meeting; categorize the meeting agenda and the meeting time into a tier level architecture using natural language processing (NLP); create a knowledge corpus using the categorized tier level architecture and the outcome of the meeting; dynamically adjust the categorized tier level architecture based on a conversation between the speaker and the audience during the meeting; train a tier level model using the created knowledge corpus; and dynamically adjust the categorized tier level architecture based on the trained tier level model. The categorized tier level architecture includes a first tier level which includes at least one of a high level text, an executive summary text, and content summary text, a second tier level which includes at least one of a mid-level content text, an overview text, and a chapter reference text, and a third tier level which includes explicit detail texts, extensive step texts, and maximum granularity text.

BRIEF DESCRIPTION OF THE DRAWINGS

Aspects of the present invention are described in the detailed description which follows, in reference to the noted plurality of drawings by way of non-limiting examples of exemplary embodiments of the present invention.

DETAILED DESCRIPTION

Figure 1:
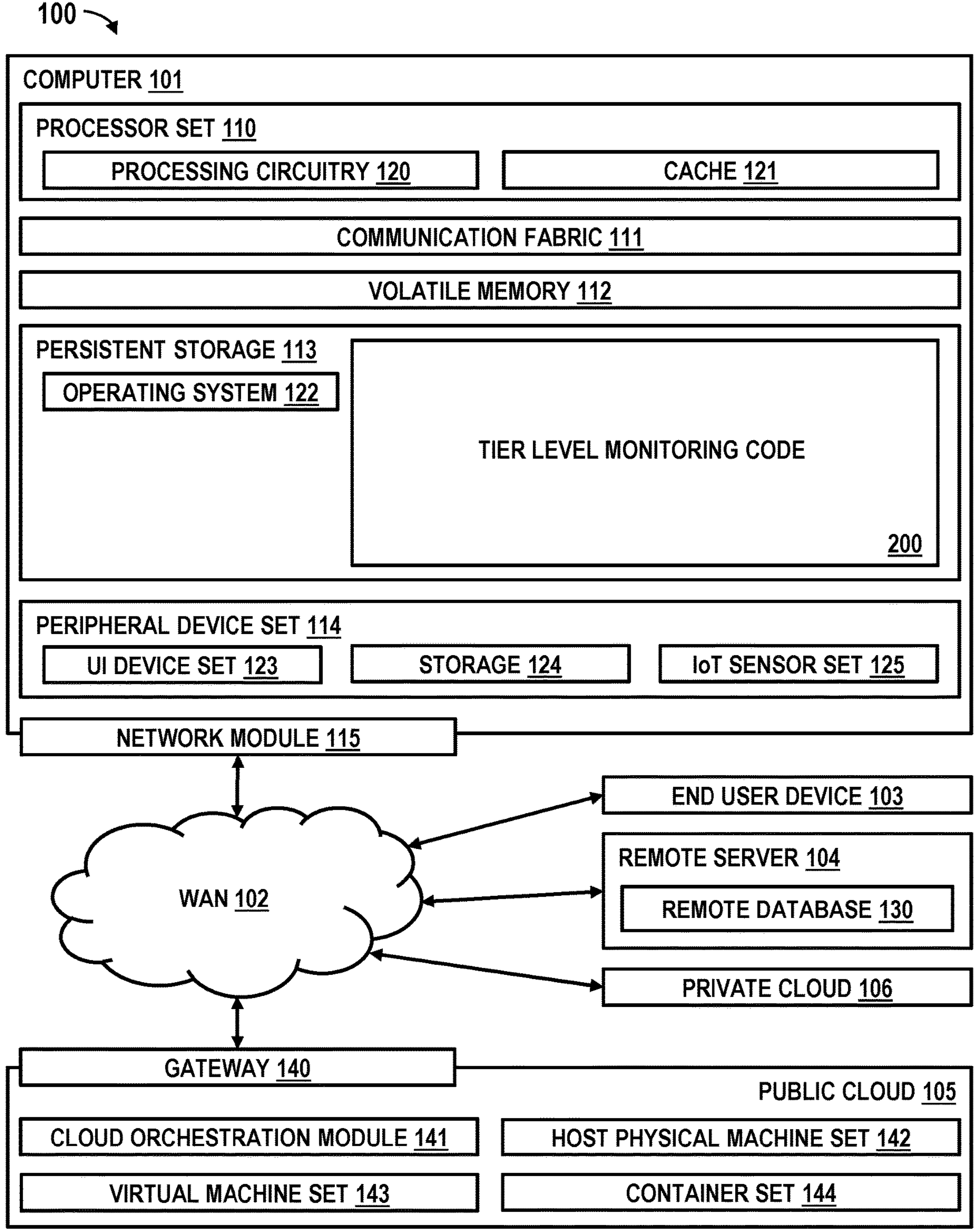
FIG. 1 depicts a computing environment according to an embodiment of the present invention.

Aspects of the present invention relate generally to an interactive presentation visual guide and, more particularly, to an interactive presentation visual guide which dynamically analyzes content that has been covered during a meeting and identifies key items that have not been covered during the meeting. As used herein, a meeting comprises a video conference that provides multipoint reception and transmission of audio and video signals by people in different locations for real time communication. Embodiments of the present invention suggest a tier level of information a presenter should focus on based on the remaining time available and the content that has already been presented. Embodiments of the present invention analyze meeting participant profile information and a meeting agenda to determine an intended outcome of the meeting. Embodiments of the present invention also scan and analyze text that the user should focus on during a meeting. Embodiments of the present invention categorize the text into different tier levels based on the importance of the content to a topic.

Embodiments of the present invention monitor a conversation between a presenter and an audience during a meeting. Embodiments of the present invention integrate speech to text technology in categorizing the text of the conversation into different tier levels. Embodiments of the present invention also utilize natural language processing (NLP) to analyze whether there is any confusion from questions asked by the audience. Embodiments of the present invention monitor the time that the presenter has based on the known meeting end time. Embodiments of the present invention utilize a visual indicator to remind the presenter to focus on core information in each tier level based on the time remaining in the meeting. In this manner, implementations of the invention dynamically analyze the content that has been covered during the meeting and identify the key remaining items of different tier levels that the presenter should focus on with the remaining available time in the meeting.

Aspects of the present invention dynamically analyze content that has been covered during a meeting and identify key remaining items that should be covered during the meeting. For example, a computer-implemented method includes: analyzing meeting participant profile information and a meeting agenda to determine an intended outcome of a meeting and classify each member into a group; analyzing text a user needs to focus on during the meeting; applying each remaining topic into a tier and building a robust knowledge corpus that supports a tier level architecture and monitoring approach; monitoring time spent on each topic through natural language processing (NLP) based on an amount of time provided and details being shared during the agenda; and providing a visual indicator to remind a presenter to focus on core information from different tier levels based on remaining amount of time of the meeting and eliminate content based on the different tier levels and the remaining amount of time of the meeting.

In embodiments, by dynamically analyzing content that has been covered during a meeting and identifying key remaining items of the meeting, aspects of the present invention are configured to suggest tiered information a presenter should focus on based on a remaining amount of available time and the content that has been covered during the meeting. Accordingly, implementations of the present invention provide an improvement (i.e., technical solution) to a problem arising in the technical field of video conferencing meetings. In particular, embodiments of the present invention build and train a robust knowledge corpus that supports a tier level architecture and monitoring approach, categorize text into different tier levels of the tier level architecture, and monitor a conversation between a presenter and an audience through usage of natural language processing (NLP) to provide an iterative feedback loop mechanism. Embodiments of the present invention also integrate speech to text technology to provide real time speech analysis with NLP modeling, dynamically change the categorized text in the tier level architecture, analyze the likelihood of confusion by an audience using NLP, dynamically change the categorized text in the tier level architecture based on a remaining amount of time in the meeting, and provide a visual indicator to the presenter to focus on core information from the different tier levels of the tier architecture. In particular, embodiments of the present invention may not be performed mentally or may not be performed in a human mind because aspects of the present invention comprise training machine learning models and using the trained models to improve tier level monitoring and dynamically change core information from the different tier levels of the tier level architecture.

Aspects of the present invention include dynamically analyzing content covered during a meeting using NLP to train a tier level model that helps to identify key remaining items of the meeting. Conventional systems rely on generating presentation material by analyzing static information. However, generating presentation material by analyzing static information in conventional systems does not allow for dynamic changes in identifying remaining key items of the meeting by analyzing the content that has been covered during the meeting. Further, because conventional systems rely on static information, conventional systems are not able to leverage a machine learning based approach using NLP modeling and techniques to train a robust tier level model for dynamically and iteratively refining the categorization of text into tier levels and providing more relevant information to the presenter based on content that has already been presented during the meeting.

Implementations of the present invention are necessarily rooted in computer technology. For example, the step of training a tier level model for providing dynamic and iterative feedback to a presenter during a meeting is computer-based and cannot be performed in the human mind. Training and using a machine learning model are, by definition, performed by a computer and cannot practically be performed in the human mind (or with pen and paper) due to the complexity and massive amounts of calculations involved. For example, an artificial neural network may have millions or even billions of weights that represent connections between nodes in different layers of the model. Values of these weights are adjusted, e.g., via backpropagation or stochastic gradient descent, when training the model and are utilized in calculations when using the trained model to generate an output in real time (or near real time). Given this scale and complexity, it is simply not possible for the human mind, or for a person using pen and paper, to perform the number of calculations involved in training and/or using a machine learning model.

It should be understood that, to the extent implementations of the invention collect, store, or employ personal information provided by, or obtained from, individuals (for example, audience members during a video conferencing meeting), such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as tier level monitoring code at block 200. In addition to block 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 200 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 200 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
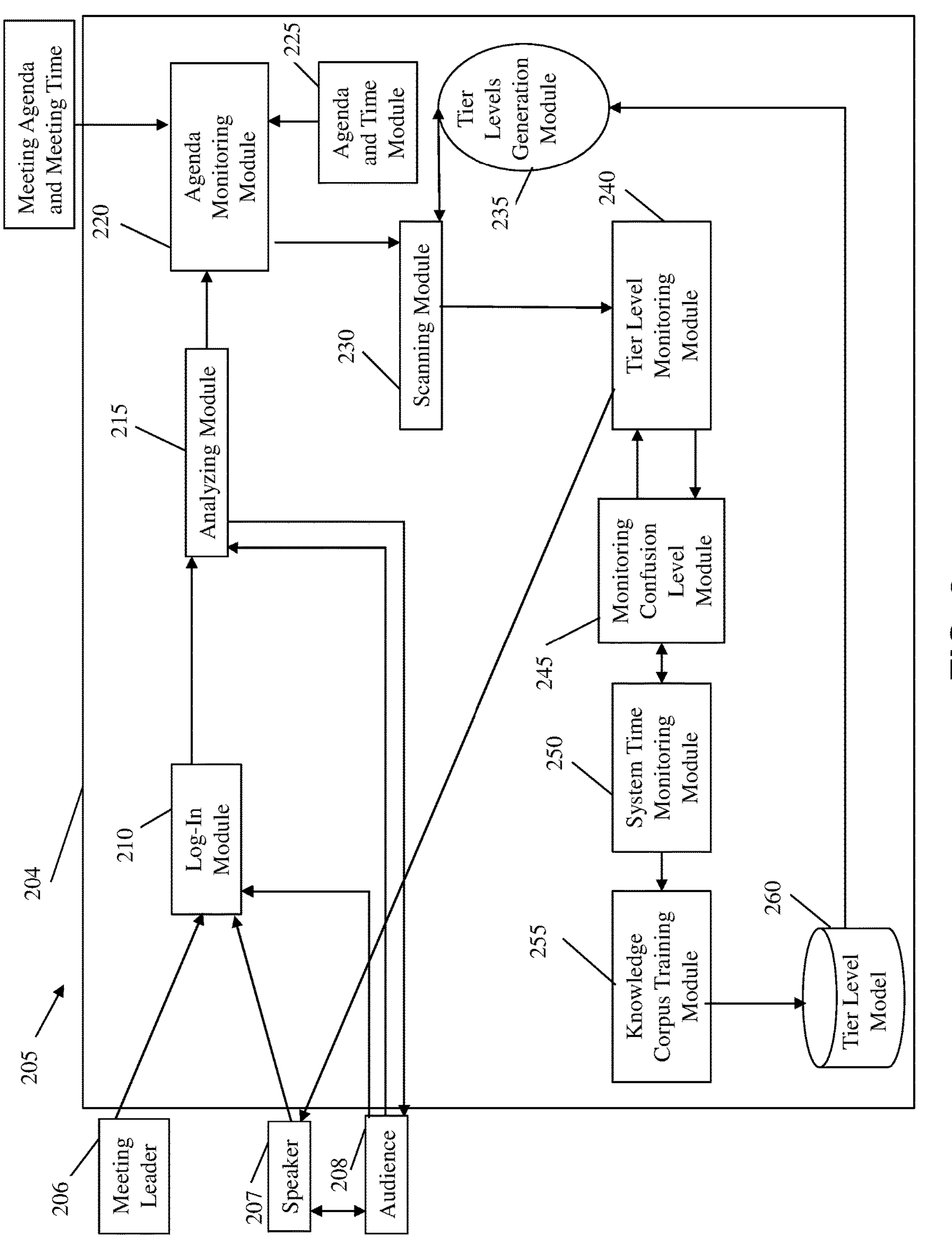
FIG. 2 shows a block diagram of an exemplary environment of an interactive presentation visual guide server in accordance with aspects of the present invention.

FIG. 2 shows a block diagram of an exemplary environment 205 in accordance with aspects of the invention. In embodiments, the environment 205 includes the interactive presentation visual guide server 204, which may comprise one or more instances of the computer 101 of FIG. 1. In other examples, the interactive presentation visual guide server 204 comprises one or more virtual machines or one or more containers running one or more instances of the computer 101 of FIG. 1.

In embodiments, the interactive presentation visual guide server 204 includes a log-in module 210, an analyzing module 215, an agenda monitoring module 220, an agenda and time module 225, a scanning module 230, a tier level generation module 235, a tier level monitoring module 240, a confusion level monitoring module 245, a system time monitoring module 250, a knowledge corpus training module 255, and a tier level model 260, each of which may comprise modules of the code of block 200 of FIG. 1. Such modules may include routines, programs, objects, components, logic, data structures, and so on that perform particular tasks or implement particular data types that the code of block 200 uses to carry out the functions and/or methodologies of embodiments of the invention as described herein. These modules of the code of block 200 are executable by the processing circuitry 120 of FIG. 1 to perform the inventive methods as described herein. The interactive presentation visual guide server 204 may include additional or fewer modules than those shown in FIG. 2. In embodiments, separate modules may be integrated into a single module. Additionally, or alternatively, a single module may be implemented as multiple modules. Moreover, the quantity of devices and/or networks in the environment is not limited to what is shown in FIG. 2. In practice, the environment may include additional devices and/or networks; fewer devices and/or networks; different devices and/or networks; or differently arranged devices and/or networks than illustrated in FIG. 2.

In accordance with aspects of the invention, the log-in module 210 receives a log-in from a meeting leader 206, a speaker 207, and an audience 208. In embodiments, each of the meeting leader 206, the speaker 207, and the audience 208 may comprise one or more instances of the end user device 103 of FIG. 1 being used by at least one person. The log-in module 210 also ensures that all participants (e.g., the meeting leader 206, the speaker 207, the audience 208, etc.) have opted-in (e.g., consented) to having their content recorded and analyzed. In an example, the log-in module 210 prompts each of the participants to opt in to have their content recorded and analyzed for analysis before allowing the participants to join and participate in a meeting. The log-in module 210 collects participant information (e.g., metadata related to the participants, participant profile information, etc.) when the participants join the meeting. In an example, the log-in module 210 collects information from a participant profile information created when the participant created a log-in account.

In embodiments, the log-in module 210 sends collected participant information (e.g., metadata related to the participants, participant profile information, etc.) to the analyzing module 215. The analyzing module 215 also receives audience information (e.g., audience profile information, audience feedback, etc.) from the audience 208. In an example, the analyzing module 215 monitors and analyzes audience feedback (e.g., questions, comments, poll replies, chat replies, etc. from the audience 208) in the meeting. The analyzing module 215 monitors and analyzes the audience feedback using natural language processing (NLP) and speech to text technology. In embodiments, speech to text technology enables recognition and translation of spoken language into text. The analyzing module 215 determines from the collected participant information whether the speaker 207 is a single speaker or multiple speakers. The analyzing module 215 also determines from the collected participant information whether the meeting leader 206 is a single meeting leader or multiple meeting leaders.

In embodiments, the analyzing module 215 sends the collected participant information, the audience information, information about the meeting leader 206, and information about the speaker 207 to the agenda monitoring module 220. The agenda monitoring module 220 also receives a meeting agenda and meeting time from an application and/or device that is external to the interactive presentation visual guide server 204 (e.g., meeting agenda and/or meeting time received from an email application, a file structure, a server, a computing device, etc.). In other embodiments, the agenda monitoring module 220 receives the meeting agenda and meeting time from within the interactive presentation visual guide server 204. The agenda monitoring module 220 monitors and analyzes the meeting agenda and meeting time to determine an intended outcome (i.e., meeting objective) of the meeting. The agenda monitoring module 220 monitors and analyzes the meeting agenda and meeting time to determine the intended outcome of the meeting using natural language processing (NLP) techniques and speech to text technology.

In embodiments, the agenda monitoring module 220 sends the meeting agenda, the meeting time, and any other subject matter (e.g., outcome of the meeting) to the scanning module 230. The scanning module 230 scans and analyzes text of the meeting agenda, the meeting time, and any other subject matter of the meeting. The scanning module 230 scans and analyzes text of the meeting agenda, the meeting time, and any other subject matter of the meeting (e.g., audience feedback, outcome of the meeting, etc.) using optical character recognition (OCR) and NLP techniques.

In embodiments, the scanning module 230 sends the scanned text of the meeting agenda, the meeting time, and any other subject matter (e.g., audience feedback, outcome of the meeting, etc.) of the meeting to the tier levels generation module 235. The tier levels generation module 235 analyzes the scanned text and builds a tier level architecture by categorizing the scanned text into plural separate tiers (i.e., a first tier, a second tier, and a third tier) based on the importance of the content to the topic. In one example, the tier levels generation module 235 categories at least one portion of the scanned text into a first tier based on the at least one portion of the scanned text being at least one of a high level text, executive summary text, and content summary level text. In this example, the tier level generation module 235 categories at least one portion of the scanned text into the second tier based on the at least one portion of the scanned text being at least one of a mid-level content text, an overview text, an outline text, a chapter reference text, etc. In this example, the tier level generation module 235 categories at least one portion of the scanned text into the third tier based on the at least one portion of the scanned text being at least one of complex detailed text, explicit detail texts, extensive step texts, maximum granularity text. In this example, the tier level generation module 235 categories the scanned text into the first tier, the second tier, and the third tier using NLP. In embodiments, after the tier levels generation module 235 builds the tier level architecture (i.e., the first tier, the second tier, and the third tier), the tier level architecture is sent back to the scanning module 230. The scanning module 230 uses the tier level architecture (i.e., the first tier, the second tier, and the third tier) and the outcome of the meeting to create a robust knowledge corpus that is used to train the tier level model 260 for providing a feedback loop for building the tier level architecture through iterative usage. For example, the scanning module 230 uses previously built tier level architectures to create and/or update the robust knowledge corpus for training the tier level model 260 through the knowledge corpus training module 255. Since the tier level generation module 235 utilizes the trained tier level model 260 for categorizing scanned text and building the tier level architecture, the tier levels generation module 235 is configured to dynamically and iteratively refine and adjust the categorization of scanned text into tier levels and provide more relevant and accurate information to the presenter as the robust knowledge corpus is updated. The robust knowledge corpus also helps to support a monitoring approach and scaling of the contribution exhortation. The details of training the tier level model are discussed herein with respect to the knowledge corpus training module 255 and the tier level model 260.

In embodiments, the scanning module 230 sends the tier level architecture (i.e., the first tier, the second tier, and the third tier), the robust knowledge corpus, and other subject matter of the meeting (e.g., audience feedback, the meeting agenda, the meeting time, etc.) to the tier level monitoring module 240. The tier level monitoring module 240 monitors a conversation between the speaker 207 and the audience 208 through NLP and speech to text technology. In particular, the tier level monitoring module 240 monitors the conversation by analyzing and contextualizing the details being shared through the meeting and the amount of time remaining in the meeting (i.e., the tier level monitoring module 240 receives feedback from the system time monitoring module 250 which calculates the amount of time remaining in the meeting by looking at start time of the meeting, end time of the meeting, and current time during the meeting).

In embodiments, the tier level monitoring module 240 utilizes speech to text technology to dynamically and iteratively refine and adjust the tier level architecture and provide the most relevant information to the speaker 207. In other words, the tier level monitoring module 240 dynamically and iteratively refines and adjusts the categorized first tier, the categorized second tier, and the categorized third tier based on the conversation between the speaker 207 and the audience 208. In particular, the tier level monitoring module 240 uses a real time speech to text technology with NLP to provide real time analysis of the conversation of the meeting and is configured to dynamically change and adjust the relevant information to the speaker (i.e., the tier level architecture) based on the content of the meeting between the speaker and the audience and the amount of time remaining in the meeting. In addition, the tier level monitoring module 240 receives feedback from the system time monitoring module 250 which calculates the amount of time remaining in the meeting by looking at start time of the meeting, end time of the meeting, and current time during the meeting. The tier level monitoring module 240 also monitors the time the speaker 207 has to present during the meeting based on the amount of time remaining in the meeting from the system time monitoring module 250 and what content has already been presented from the meeting agenda. In embodiments, the tier level monitoring module 240 dynamically changes and adjusts the tier level architecture presented to the speaker 207 based on the content which has already been presented during the meeting between the speaker 207 and the audience 208.

In embodiments, the tier level monitoring module 240 also communicates the tier level architecture with speaker 207 to provide a visual indicator to remind the speaker to focus on core information from different tiers of the tier level architecture based on the amount of time remaining in the meeting. For example, the speaker 207 may overlay the visual indicator within a web interface application. In particular, the speaker 207 uses the speech to text technology to scale up or scale down the visual indicator. For example, the speaker 207 includes a first visual indicator that corresponds with the first tier (i.e., at least one content of a high level text, executive summary text, and content summary level text), a second visual indicator that corresponds with the second tier (i.e., at least one content of a mid-level content text, an overview text, an outline text, a chapter reference text, etc.), and a third visual indicator that corresponds with the third tier (i.e., at least one content of complex detailed text, explicit detail texts, extensive step texts, and maximum granularity text). Further details of the speaker 207 are described herein with respect to FIG. 4.

In embodiments, the tier level monitoring module 240 sends the tier level architecture (i.e., the first tier, the second tier, and the third tier), the robust knowledge corpus, and other subject matter of the meeting (e.g., audience feedback, the meeting agenda, the meeting time, etc.) to the confusion level monitoring module 245. The confusion level monitoring module 245 analyzes the audience feedback from the audience 208 and determines whether there is confusion from the audience feedback from the audience 208. In particular, the confusion level monitoring module 245 determines whether there is confusion from the audience feedback from the audience 208 by using NLP. For example, if the audience feedback includes a phrase such as "I don't understand", the confusion level monitoring module 245 determines that there is confusion from audience feedback of the audience 208 and sends a determination that there is confusion back to the tier level monitoring module 240. In this example, upon receiving the determination of confusion, the tier level monitoring module 240 dynamically adjusts the tier level architecture to refine the content presented to the speaker 207 through the tier level architecture so that the speaker 207 can either re-iterate the points in a more straightforward and direct approach or provide more details and context to provide more clarity and less confusion to the audience. In further embodiments, the confusion level monitoring module 245 determines whether there is confusion from the audience feedback of the audience 208 using at least one of facial movement video tracking, head movement video tracking, speech to text technology, and NLP of the audience 208. In embodiments, the confusion level monitoring module 245 determines whether there is confusion from at least one of the meeting leader 206 and the speaker 207 using at least one of facial movement video tracking, head movement video tracking, speech to text technology, and NLP.

In embodiments, the confusion level monitoring module 245 sends the tier level architecture (i.e., the first tier, the second tier, and the third tier), the robust knowledge corpus, and other subject matter of the meeting (e.g., audience feedback, the meeting agenda, the meeting time, etc.) to the system time monitoring module 250. As detailed above, the system time monitoring module 250 calculates the amount of time remaining in the meeting by looking at the start time of the meeting, the end time of the meeting, and the current time during the meeting to determine a remaining amount of time in the meeting. The system monitoring module 250 then sends the remaining amount of time in the meeting to the confusion level monitoring module 245, which then passes the remaining amount of time in the meeting to the tier level monitoring module 240.

In embodiments, the system time monitoring module 250 sends the tier level architecture (i.e., the first tier, the second tier, and the third tier), the robust knowledge corpus, and other subject matter of the meeting (e.g., audience feedback, the meeting agenda, the meeting time, etc.) to the knowledge corpus training module 255. The knowledge corpus training module 255 uses the tier level architecture (i.e., the first tier, the second tier, and the third tier) and the robust knowledge corpus to train the tier level model 260. In embodiments, the tier level model 260 is a Latent Dirichlet Allocation (LDA) model which is trained using a number of topics, how many documents (e.g., data) are processed at a time, how often training occurs using the robust knowledge corpus and the tier level architecture, and how often a loop is repeated for each document. In particular, once the tier level model 260 is trained by the knowledge corpus training module 255, the trained tier level model 260 provides dynamic and iterative feedback to the tier level generation module 235 for refining and adjusting the categorization of tier level architecture and providing more relevant and accurate information to the presenter. As the tier level model 260 is trained more often, the tier level generation module 235 can provide a more accurate categorization of the scanned text into tier levels and provide more relevant and accurate information to the presenter.

In embodiments, the analyzing module 215, the agenda monitoring module 220, the scanning module 230, tier level generation module 235, the tier level monitoring module 240, and the confusion level monitoring module 245 use NLP such as a Latent Dirichlet Allocation (LDA) model to analyze, monitor, scan, and categorize textual data. In embodiments, the LDA model is used to identify and categorize text into different topics. However, embodiments are not limited, and other NLP may be used to analyze, monitor, scan, and categorize textual data within the interactive presentation visual guide server 204.

The interactive presentation visual guide server 204 of FIG. 2 is configured to be used in different scenarios. In an example, the first three presenters present their disclosures and take longer than expected to complete their presentations. In addition, a fourth presenter (i.e., the speaker 207) may be ready to present a disclosure document to a patent review board (e.g., the audience 208) during a meeting. However, the fourth presenter does not have enough time to present the full disclosure. In addition, the fourth presenter doesn't want to reschedule the meeting because the fourth presenter wants to move to the next step in the process. During the presentation by the fourth presenter, the patent review board members interactively ask the fourth presenter questions and the fourth presenter answers the questions. The interactive presentation visual guide server 204 of FIG. 2 analyzes the questions by the patent review board members and the answers by the fourth presenter through speech to text technology and NLP. Then, based on the low amount of time remaining in the meeting, the interactive presentation visual server 204 of FIG. 2 provides suggestions to the fourth presenter through a visual indicator of the tier level architecture to focus on a few critical novelty points of the disclosure which are included in the first tier of the tier level architecture.

In another example, a leader (i.e., the meeting leader 206) runs a daily scrum meeting each weekday morning to discuss work tasks that need to be accomplished each day. As the leader runs the daily scrum meeting, the interactive presentation visual guide server 204 of FIG. 2 monitors the content and progression of the meeting agenda through the daily scrum meeting. For example, the meeting agenda may focus on key items, such as what work tasks were accomplished yesterday, what work tasks are planned for today, and any blockers that may be experienced by each team member. In this scenario, the interactive presentation visual guide server 204 of FIG. 2 monitors various types of information that should be provided for the various team members and what time is remaining for each team member to report their work tasks and blockers. For example, the interactive presentation visual guide server 204 provides positive feedback to the team member within the visual indicator of the tier level architecture when they are presenting to indicate that they are including the key items and to make sure to present these remaining items during the remaining time for the team member. The interactive presentation visual guide server 204 also provides negative feedback to the team member within the visual indicator of the tier level architecture when they are providing too many details and need to exclude or remove items that should be excluded based on the remaining time for the team member. Accordingly, the interactive presentation visual guide server 204 provides a dynamic and real time adjustment to the team member to ensure that both the positive and negative feedback is considered and addressed within the daily scrum meetings in view of the remaining time available for the team member during the daily scrum meeting.

In another example, a meeting leader (i.e., the meeting leader 206) uses the interactive presentation visual guide server 204 of FIG. 2 to perform a preliminary analysis of an invention based on pre-evaluation questions that surfaced in a first meeting with inventors. In particular, the preliminary analysis performed by the presentation visual guide server 204 helps the meeting leader to focus the presenters on specific areas to provide a more efficient evaluation meeting. In embodiments, the interactive presentation visual guide server 204 performs NLP on the pre-evaluation questions to perform the preliminary analysis to optimize the focus for the presenters within the visual indicator of the tier level architecture and commentary direct for a final review that is handled within a disclosure meeting.

In another example, the interactive presentation visual guide server 204 of FIG. 2 is also configured to be used with a conversational artificial intelligence (AI) chatbot. In conventional systems, a conversational AI chatbot may take a long time for people to get the right answers if their input is too long or too short. In other words, conventional systems do not focus on the core topics, and therefore may take a long time to get the right answers. In contrast, the interactive visual guide server 204 is configured to provide suggestions to the user to provide more or fewer details based on a tier level architecture and provide further suggestions about a core area the user should focus on when communicating with the AI chatbot. Thus, by using the interactive visual guide server 204 with the AI chatbot, the AI chatbot can find the right answers for the users quicker than conventional systems.

Figure 3:
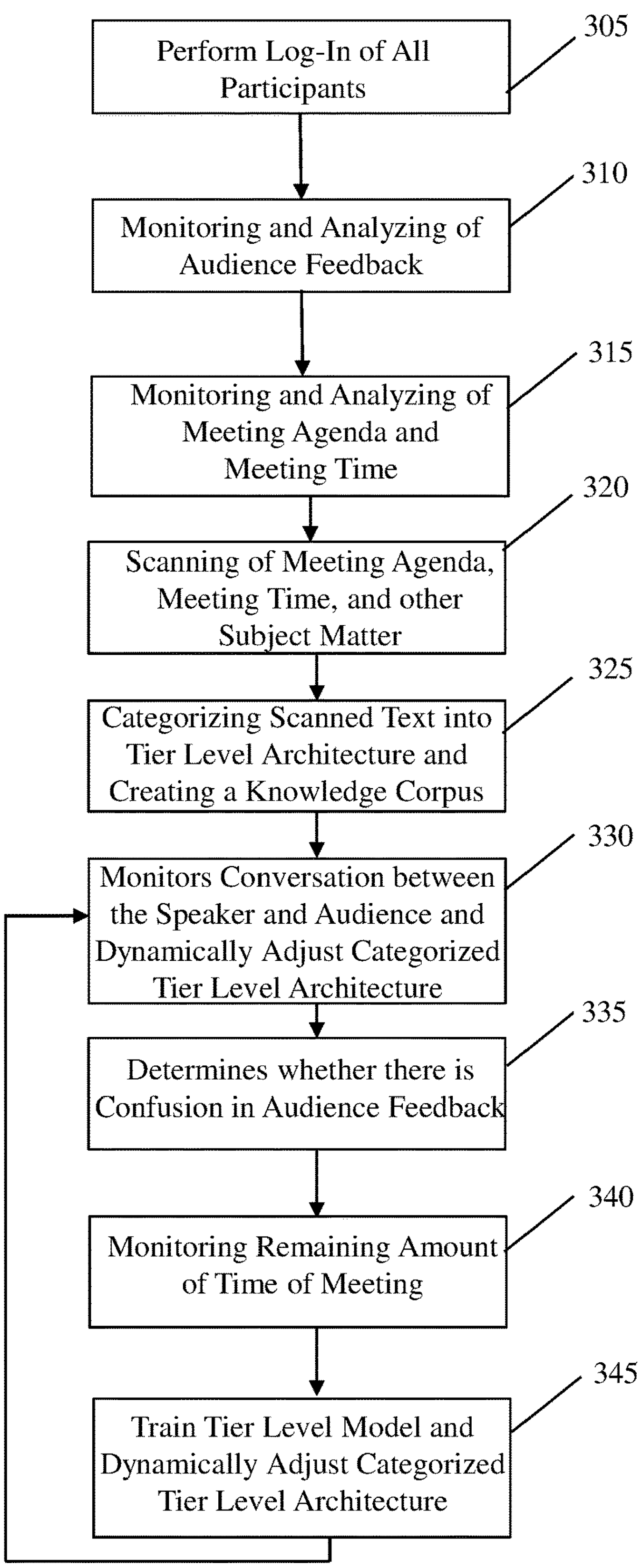
FIG. 3 shows a flowchart of an exemplary method of the interactive presentation visual guide server in accordance with aspects of the present invention.

FIG. 3 shows a flowchart of an exemplary method in accordance with aspects of the present invention. Steps of the method may be carried out in the environment of FIG. 2 and are described with reference to elements depicted in FIG. 2.

At step 305, the system performs, at the log-in module 210, a log-in from all participants (e.g., a meeting leader 206, a speaker 207, an audience 208, etc.). In embodiments, and as described with respect to FIG. 2, the log-in module 210 ensures that all participants (e.g., the meeting leader 206, the speaker 207, the audience 208, etc.) have opted-in to have their content recorded and analyzed. At step 310, the system performs, at the analyzing module 215, monitoring and analyzing of audience feedback from the audience 208. In embodiments, and as described with respect to FIG. 2, the analyzing module 215 monitors and analyzes audience feedback from the audience 208 using natural language processing techniques (NLP). At step 315, the system performs, at the agenda monitoring module 220, monitoring and analyzing of a meeting agenda and a meeting time to determine an intended outcome (i.e., meeting objective) of the meeting. In embodiments, and as described with respect to FIG. 2, the agenda monitoring module 220 monitors and analyzes the meeting agenda and the meeting time to determine the intended outcome of the meeting using NLP and speech to text technology. At step 320, the system performs, at the scanning module 230, scanning of the meeting agenda, the meeting time, and any other subject matter (e.g., audience feedback) of the meeting and sending of the scanned text of the meeting agenda, the meeting time, and any other subject matter (e.g., outcome of the meeting) to a tier level levels generation module 235. In embodiments, and as described with respect to FIG. 2, the scanning module 230 scans text of the meeting agenda, the meeting time, and any other subject matter (e.g., outcome of the meeting) using optical character recognition (OCR) and NLP.

At step 325, the system categorizes, at the tier levels generation module 235, the scanned text of the meeting agenda, the meeting time, and any other subject matter (e.g., outcome of the meeting) and builds a tier level architecture using the categorized scanned text of the meeting agenda, the meeting time, and any other subject matter. In embodiments, and as described with respect to FIG. 2, the tier levels generation module 235 categorizes at least one portion of the scanned text of the meeting agenda, the meeting time, and any other subject matte into a first tier based on the at least one portion of the scanned text being at least one of a high level text, executive summary text, and content summary text. Further, the tier levels generation module 235 categorizes at least one portion of the scanned text of the meeting agenda, the meeting time, and any other subject matter into a second tier based on the at least one portion of the scanned text being at least one of a mid-level content text, an overview text, a chapter reference text, etc. The tier levels generation module 235 categorizes at least one portion of the scanned text of the meeting agenda, the meeting time, and any other subject matter into a third tier based on the at least one portion of the scanned text being at least one of complex detailed text, explicit detail texts, extensive step texts, and maximum granularity text. The tier levels generation module 235 builds the tier level architecture using the first tier, the second tier, and the third tier. In further embodiments, the tier level architecture and the outcome of the meeting is used by the scanning module 230 to create a robust knowledge corpus for training a tier level model 260.

At step 330, the system monitors, at the tier level monitoring module 240, a conversation between the speaker 207 and the audience 208. In embodiments, and as described with respect to FIG. 2, the tier level monitoring module 240 monitors the conversation through NLP and speech to text technology. In particular, the tier level monitoring module 240 monitors the conversation between the speaker 207 and the audience 208 by analyzing and contextualizing the details being shared through the meeting and the amount of time remaining in the meeting. The tier level monitoring module 240 also provides a visual indicator to remind the speaker 207 to focus on core information from different tiers of the build tier level architecture based on the content already presented in the meeting and the amount of time remaining in the meeting. In particular, the tier level monitoring module 240 dynamically changes and adjusts the tier level architecture presented to the speaker 207 based on the content which has already been presented during the meeting between the speaker 207 and the audience 208.

At step 335, the system determines, at the confusion level monitoring module 245, whether there is confusion in the audience feedback from the audience 208. In embodiments, and as described with respect to FIG. 2, the confusion level monitoring module 245 determines whether is confusion from the audience feedback of the audience 208 using at least one of facial movement video tracking, head movement video tracking, speech to text technology, and NLP. For example, in response to a determination that there is confusion in the confusion level monitoring module 245, the confusion level monitoring module 245 sends the determination that there is confusion to the tier level monitoring module 240. In this scenario, upon receiving the determination of confusion, the tier level monitoring module 240 dynamically adjusts the tier level architecture so that the speaker 207 re-iterates the points in a more straightforward and direct approach or provides more details and context to provide more clarity and less confusion to the audience 208.

At step 340, the system calculates, at the system time monitoring module 250, an amount of time remaining in the meeting by determining the start time of the meeting, the end time of the meeting, and the current time during the meeting. In embodiments, and as described with respect to FIG. 2, the system time monitoring module 250 sends the amount of time remaining to the tier level monitoring module 240 via the confusion level monitoring module 245.

At step 345, the system trains, at the knowledge corpus training module 255, a tier level model 260 using the built tier level architecture (i.e., the first tier, the second tier, and the third tier), and the robust knowledge corpus. In embodiment, and as described with respect to FIG. 2, the trained tier level model 260 provides dynamic and iterative feedback to the tier levels generation module 235 for refining and adjusting the categorized tier level architecture and providing more relevant and accurate information to the presenter (i.e., the speaker 207).

Figure 4:
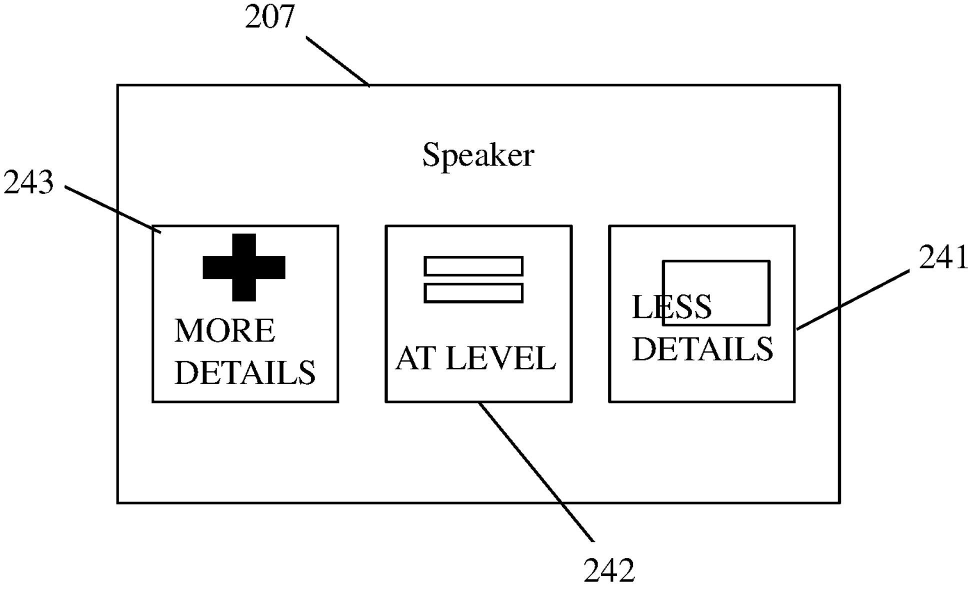
FIG. 4 shows an example of a visual indicator device in accordance with aspects of the present invention.

FIG. 4 shows an example of the speaker 207. In particular, the speaker 207 receives the tier level architectures from the tier level monitoring module 240. In embodiments, the speaker 207 includes at least one visual indicator of the tier level architecture that reminds the speaker to focus on core information from different tiers of the tier level architecture based on the amount of time remaining in the meeting and the content already presented in the meeting. For example, the at least one visual indicator of the speaker 207 may be overlayed within a web interface application.

For example, the web interface application of the speaker 207 includes a first visual indicator 241 that corresponds with the first tier (i.e., at least one content of a high level text, executive summary text, and content summary level text). The web interface application of the speaker 207 also includes a second visual indicator 242 that corresponds with the second tier (i.e., at least one content of a mid-level content text, an overview text, an outline text, a chapter reference text, etc.) The web interface application of the speaker 207 also includes a third visual indicator 243 that corresponds with the third tier (i.e., at least one content of complex detailed text, explicit detail texts, extensive step texts, and maximum granularity text). In particular, the speaker 207 uses the speech to text technology to scale up (e.g., provide less details at the first visual indicator 241) or scale down (e.g., provide more detail at the third visual indicator 243) using the at least one visual indicator of the tier level architecture. Further, each of the first visual indicator 241, the second visual indicator 242, and the third visual indicator 243 may be icons within the web interface application of the speaker 207. In an example, a presenter (i.e., the speaker 207) may click on an icon corresponding to one of the first visual indicator 241, the second visual indicator 242, and the third visual indicator 243 to show content that corresponds with the tier level architecture of the speaker 207. In an example, the speaker may click on the first visual indicator 242 to show at least one content of a high level text, executive summary text, and content summary level text. Each of the first visual indicator 241, the second visual indicator, and the third visual indicator 243 may have a different colored icon from remaining icons so that it is easy to distinguish between the different icons (e.g., the first visual indicator 241 may have a red icon, the second visual indicator 242 may have a blue icon, and the third visual indicator 243 may have a green icon).

In embodiments, a service provider could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

In still additional embodiments, the invention provides a computer-implemented method, via a network. In this case, a computer infrastructure, such as computer 101 of FIG. 1, can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer 101 of FIG. 1, from a computer readable medium; (2) adding one or more computing devices to the computer infrastructure; and (3) incorporating and/or modifying one or more existing systems of the computer infrastructure to enable the computer infrastructure to perform the processes of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, comprising:

receiving, by a processor set, a meeting agenda, a meeting time, a speaker, and an audience of a meeting;

analyzing, by the processor set, the meeting agenda and the meeting time for an outcome of the meeting;

categorizing, by the processor set, the meeting agenda and the meeting time into a tier level architecture using natural language processing (NLP);

creating, by the processor set, a knowledge corpus using the categorized tier level architecture and the outcome of the meeting;

dynamically adjusting, by the processor set, the categorized tier level architecture based on a conversation between the speaker and the audience during the meeting;

training, by the processor set, a tier level model using the created knowledge corpus; and dynamically adjusting, by the processor set, the categorized tier level architecture based on the trained tier level model.

2. The method of claim 1, further comprising determining there is confusion based on audience feedback of the audience during the conversation between the speaker and the audience.

3. The method of claim 2, further comprising dynamically adjusting the categorized tier level architecture in response to the determining there is confusion.

4. The method of claim 3, wherein the determining there is confusion is based on NLP of the conversation between the speaker and the audience.

5. The method of claim 3, wherein the determining there is confusion is based on speech to text technology of the conversation between the speaker and the audience.

6. The method of claim 1, further comprising receiving opt-in consent from the speaker and the audience to have their content recorded and analyzed before starting the meeting between the speaker and the audience.

7. The method of claim 1, further comprising calculating an amount of time remaining in the meeting based on the meeting time and a current time during the meeting.

8. The method of claim 7, further comprising dynamically adjusting the categorized tier level architecture in response to the calculated amount of time remaining in the meeting.

9. The method of claim 8, wherein the dynamically adjusting the categorized tier level architecture in response to the calculated amount of time remaining in the meeting comprises reminding the speaker to focus on at least one of a high level text, an executive summary text, and content summary text in response to the calculated amount of time remaining in the meeting being below a predetermined amount of time.

10. The method of claim 8, wherein the dynamically adjusting the categorized tier level architecture comprises reminding the speaker to include at least one of complex detailed text, explicit detail texts, extensive step texts, and maximum granularity text in response to the calculated amount of time remaining the meeting being above the predetermined amount of time.

11. The method of claim 1, wherein the categorized tier level architecture includes a first tier level which includes at least one of a high level text, an executive summary text, and content summary text, a second tier level which includes at least one of a mid-level content text, an overview text, and a chapter reference text, and a third tier level which includes explicit detail texts, extensive step texts, and maximum granularity text.

12. The method of claim 1, wherein the tier level model comprises a Latent Dirichlet Allocation (LDA) model.

13. A computer program product comprising one or more computer readable storage media having program instructions collectively stored on the one or more computer readable storage media, the program instructions executable to:

receive a meeting agenda, a meeting time, a speaker, and an audience of a meeting;

analyze the meeting agenda and the meeting time for an outcome of the meeting;

categorize the meeting agenda and the meeting time into a tier level architecture using natural language processing (NLP);

create a knowledge corpus using the categorized tier level architecture and the outcome of the meeting;

dynamically adjust the categorized tier level architecture based on a conversation between the speaker and the audience during the meeting;

train a tier level model using the created knowledge corpus; and dynamically adjust the categorized tier level architecture based on the trained tier level model.

14. The computer program product of claim 13, further comprising determining there is confusion based on audience feedback of the audience during the conversation between the speaker and the audience.

15. The computer program product of claim 14, further comprising dynamically adjusting the categorized tier level architecture in response to the determining there is confusion.

16. The computer program product of claim 13, further comprising calculating an amount of time remaining in the meeting based on the meeting time and a current time during the meeting.

17. The computer program product of claim 16, dynamically adjusting the categorized tier level architecture in response to the calculated amount of time remaining in the meeting.

18. The computer program product of claim 13, wherein the categorized tier level architecture includes a first tier level which includes at least one of a high level text, an executive summary text, and content summary text, a second tier which includes at least one of a mid-level content text, an overview text, and a chapter reference text, and a third tier which includes explicit detail texts, extensive step texts, and maximum granularity text.

19. A system comprising:

a processor set, one or more computer readable storage media, and program instructions collectively stored on the one or more computer readable storage media, the program instructions executable to:

receive a meeting agenda, a meeting time, a speaker, and an audience of a meeting;

analyze the meeting agenda and the meeting time for an outcome of the meeting;

categorize the meeting agenda and the meeting time into a tier level architecture using natural language processing (NLP);

create a knowledge corpus using the categorized tier level architecture and the outcome of the meeting;

dynamically adjust the categorized tier level architecture based on a conversation between the speaker and the audience during the meeting;

train a tier level model using the created knowledge corpus; and dynamically adjust the categorized tier level architecture based on the trained tier level model, wherein the categorized tier level architecture includes a first tier level which includes at least one of a high level text, an executive summary text, and content summary text, a second tier level which includes at least one of a mid-level content text, an overview text, and a chapter reference text, and a third tier level which includes explicit detail texts, extensive step texts, and maximum granularity text.

20. The system of claim 19, further comprising determining there is confusion based on audience feedback of the audience during the conversation between the speaker and the audience.

* * * * *